US012756343B2

(12) United States Patent
Okumatsu

(10) Patent No.: US 12,756,343 B2
(45) Date of Patent: Oct. 6, 2026

(54) CURRENT DETECTION DEVICE, CURRENT DETECTION METHOD, AND NON-TRANSITORY STORAGE MEDIUM

(71) Applicant: TOYOTA JIDOSHA KABUSHIKI KAISHA, Toyota (JP)

(72) Inventor: Yoshihiro Okumatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 228 days.

(21) Appl. No.: 18/794,096

(22) Filed: Aug. 5, 2024

(65) Prior Publication Data

US 2025/0080025 A1 Mar. 6, 2025

(30) Foreign Application Priority Data

Sep. 5, 2023 (JP) ................................ 2023-143349

(51) Int. Cl.
*H02P 27/08* (2006.01)
*H02P 21/22* (2016.01)
*H02P 23/14* (2006.01)

(52) U.S. Cl.
CPC .................................... *H02P 23/14* (2013.01)

(58) Field of Classification Search
CPC ........... H02P 23/14; H02P 27/08; H02P 21/22
USPC .......................................................... 318/474
See application file for complete search history.

(56) References Cited

U.S. PATENT DOCUMENTS

2012/0049858 A1* 3/2012 Hiraki .................... H03K 17/18 324/555
2015/0123580 A1* 5/2015 Omata .................. H02P 29/032 318/400.17
2016/0098019 A1 4/2016 Kirshenboim et al.
2019/0372503 A1 12/2019 Hatano et al.
2021/0399650 A1* 12/2021 Ujimaru .............. H02M 1/0032
2022/0109393 A1* 4/2022 Kawaguchi ............. H02P 29/40
2022/0200500 A1* 6/2022 Hayasaka ............... H02P 27/08
2023/0003767 A1* 1/2023 Bang .................... G01R 15/146

FOREIGN PATENT DOCUMENTS

JP 2016-077140 A 5/2016
JP 2019-213285 A 12/2019

OTHER PUBLICATIONS

Niu, "A Comparative Study of Over-Current Sensing for Traction Inverters," Hindawi Active and Passive Electronic Components, Review Article, Jan. 21, 2021, 6 pages.

* cited by examiner

*Primary Examiner* — Gabriel Agared
(74) *Attorney, Agent, or Firm* — Oliff PLC

(57) ABSTRACT

A current detection device includes a first current calculation unit configured to calculate a first current value, a second current calculation unit configured to calculate a second current value, and a control current determination unit. The first current value is a current value obtained by converting a non-rated drive current into a digital value using a first resolution. The second current value is a current value obtained by converting a within-rating drive current into a digital value using a second resolution. The control current determination unit is configured to output the second current value as a value of a control current during a period in which the first current value is within a first threshold range, and output the first current value as the value of the control current during a period in which the first current value is outside the first threshold range.

10 Claims, 6 Drawing Sheets

CURRENT DETECTION DEVICE, CURRENT DETECTION METHOD, AND NON-TRANSITORY STORAGE MEDIUM

CROSS-REFERENCE TO RELATED APPLICATION

This application claims priority to Japanese Patent Application No. 2023-143349 filed on Sep. 5, 2023 incorporated herein by reference in its entirety.

BACKGROUND

1. Technical Field

The present disclosure relates to a current detection device, a current detection method, and a non-transitory storage medium.

2. Description of Related Art

Motors are used to operate joints and the like of robots. In motor control, an inverter is used to control rotation. In order to drive the motor with this inverter, a drive current applied to the motor from the inverter is detected and the detected drive current is used for feedback control. For this purpose, a motor drive device that controls the motor detects the drive current. An example of a motor control device that involves drive current detection processing is disclosed in Japanese Unexamined Patent Application Publication No. 2019-213285 (JP 2019-213285 A).

The motor control device disclosed in JP 2019-213285 A includes: an inverter including a plurality of switching elements for switching on and off; and a current detection unit that detects phase current values output from the inverter to respective phases of a three-phase alternating current (AC) motor; a conversion unit that converts the phase current values detected by the current detection unit into respective digital values, which are analog-to-digital (AD) conversion values; and a modulation unit that compares a phase voltage command value based on the AD conversion values from the conversion unit and a PWM counter value generated using a timer operating at a predetermined cycle, generates a pulse width modulation (PWM) signal, and outputs the generated PWM signal to the inverter, thereby switching the switching elements of the inverter to control the three-phase AC motor.

SUMMARY

In a robot, a rated output is set for the motor, and there is a steady operation range and an instantaneous output operation range. The steady operation range is a range in which an arm is driven within the rated output, and the instantaneous output operation range is a range in which the motor is instantaneously operated with power equal to or higher than the rated output in the situation in which the arm etc. collides with an object or assists in sudden refraction of an object supported by the arm. In the instantaneous output operation range, sensing of force applied to the motor and force control of the motor are performed using only the detected drive current. In the instantaneous output operation range, it is necessary to detect a drive current that is about 10 times as large as that in the steady operation range. Therefore, motor control devices installed in such robots are required to detect the drive current with high precision in the steady operation range, and are required to detect the drive current over a wide dynamic range in the instantaneous output operation range. However, the motor control device described in JP 2019-213285 A has a problem in that it is difficult to detect the drive current with high precision over a wide dynamic range.

The present disclosure provides a current detection device, a current detection method, and a non-transitory storage medium that achieve both drive current detection performed over a wide dynamic range and drive current detection with high precision.

A current detection device according to a first aspect of the present disclosure includes a first current calculation unit, a second current calculation unit, and a control current determination unit. The first current calculation unit is configured to calculate a first current value. The first current value is a current value obtained by converting a non-rated drive current into a digital value using a first resolution, and the non-rated drive current is a current that fluctuates in a larger range than a preset rated value out of drive currents output by an inverter configured to drive a motor. The second current calculation unit is configured to calculate a second current value. The second current value is a current value obtained by converting a within-rating drive current into a digital value using a second resolution, and the within-rating drive current is a current that fluctuates in a current range within the rated value out of the drive currents. The control current determination unit is configured to output the second current value as a value of a control current during a period in which the first current value is within a preset first threshold range. The control current determination unit is configured to output the first current value as the value of the control current during a period in which the first current value is outside the first threshold range.

In the current detection device according to the first aspect of the present disclosure, the control current determination unit may be configured to, when determination is made that the second current value is within the first threshold range and the second current value is outside a second threshold range narrower than the first threshold range, alternately output the first current value and the second current value as the value of the control current at each output timing.

In the current detection device according to the first aspect of the present disclosure, the control current determination unit may be configured to, when determination is made that the second current value is outside the first threshold range, output the first current value as the value of the control current. The control current determination unit may be configured to, when determination is made that the second current value is outside the second threshold range and the second current value is within the first threshold range, alternately output the first current value and the second current value as the value of the control current at each output timing. The control current determination unit may be configured to, when determination is made that the second current value is within the second threshold range, output the second current value as the value of the control current.

In the current detection device according to the first aspect of the present disclosure, the first threshold range may be a range equal to or less than the rated value.

In the current detection device according to the first aspect of the present disclosure, the first resolution and the second resolution may be the same resolution.

In the current detection device according to the first aspect of the present disclosure, the first current calculation unit may include: a first voltage measurement unit configured to convert a voltage in a voltage range corresponding to the non-rated drive current into a voltage in a first input range, and output a high voltage input voltage; and a high load side current calculation unit configured to convert the high voltage input voltage into a digital value, and calculate the first current value from the high voltage input voltage converted to the digital value. The second current calculation unit may include: a second voltage measurement unit configured to convert a voltage in a voltage range corresponding to the within-rating drive current into a voltage in a second input range, and output a low voltage input voltage; and a low load side current calculation unit configured to convert the low voltage input voltage into a digital value, and calculate the second current value from the low voltage input voltage converted to the digital value.

In the current detection device according to the first aspect of the present disclosure, the first input range and the second input range may be voltage ranges of the same size.

In the current detection device according to the first aspect of the present disclosure, the control current determination unit may be configured to output the value of the control current to a pulse width modulation command value generation unit. The pulse width modulation command value generation unit may be configured to generate a pulse width modulation command value. The pulse width modulation command value may be a command value for specifying at least one of a duty ratio and a frequency of a pulse width modulation signal output by the inverter using the value of the control current as one parameter.

A current detection method according to a second aspect of the present disclosure is performed by a calculation device. The calculation device is configured to measure a drive current output by an inverter configured to drive a motor, and calculate a control current corresponding to a magnitude of the drive current. The current detection method includes: calculating a first current value, calculating a second current value, outputting the second current value as a value of the control current during a period in which the first current value is within a preset first threshold range; and outputting the first current value as the value of the control current during a period in which the first current value is outside the first threshold range. The first current value is a current value obtained by converting a non-rated drive current into a digital value using a first resolution, and the non-rated drive current is a current that fluctuates in a larger range than a preset rated value out of the drive currents. The second current value is a current value obtained by converting a within-rating drive current into a digital value using a second resolution, and the within-rating drive current is a current that fluctuates within the preset rated value out of the drive currents.

A non-transitory storage medium according to a third aspect of the present disclosure is configured to store instructions that are executable by one or more processors and cause the one or more processors to perform the following functions. The functions include: measuring a drive current output by an inverter that drives a motor, and calculating a control current corresponding to a magnitude of the drive current; calculating a first current value; calculating a second current value; outputting the second current value as a value of the control current during a period in which the first current value is within a preset first threshold range; and outputting the first current value as the value of the control current during a period in which the first current value is outside the first threshold range. The first current value is a current value obtained by converting a non-rated drive current into a digital value using a first resolution, and the non-rated drive current is a current that fluctuates in a larger range than a preset rated value out of the drive currents. The second current value is a current value obtained by converting a within-rating drive current into a digital value using a second resolution, and the within-rating drive current is a current that fluctuates within the preset rated value out of the drive currents.

In the current detection device, the current detection method, and the non-transitory storage medium according to the present disclosure, the first current value is calculated from a measured value corresponding to high voltage, and the second current value is calculated from a measured value corresponding to low voltage, and when the drive current exceeds the threshold range set for the first current value, the first current value is set as the drive current.

According to the present disclosure, it is possible to achieve both drive current detection over a wide dynamic range and drive current detection with high precision.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
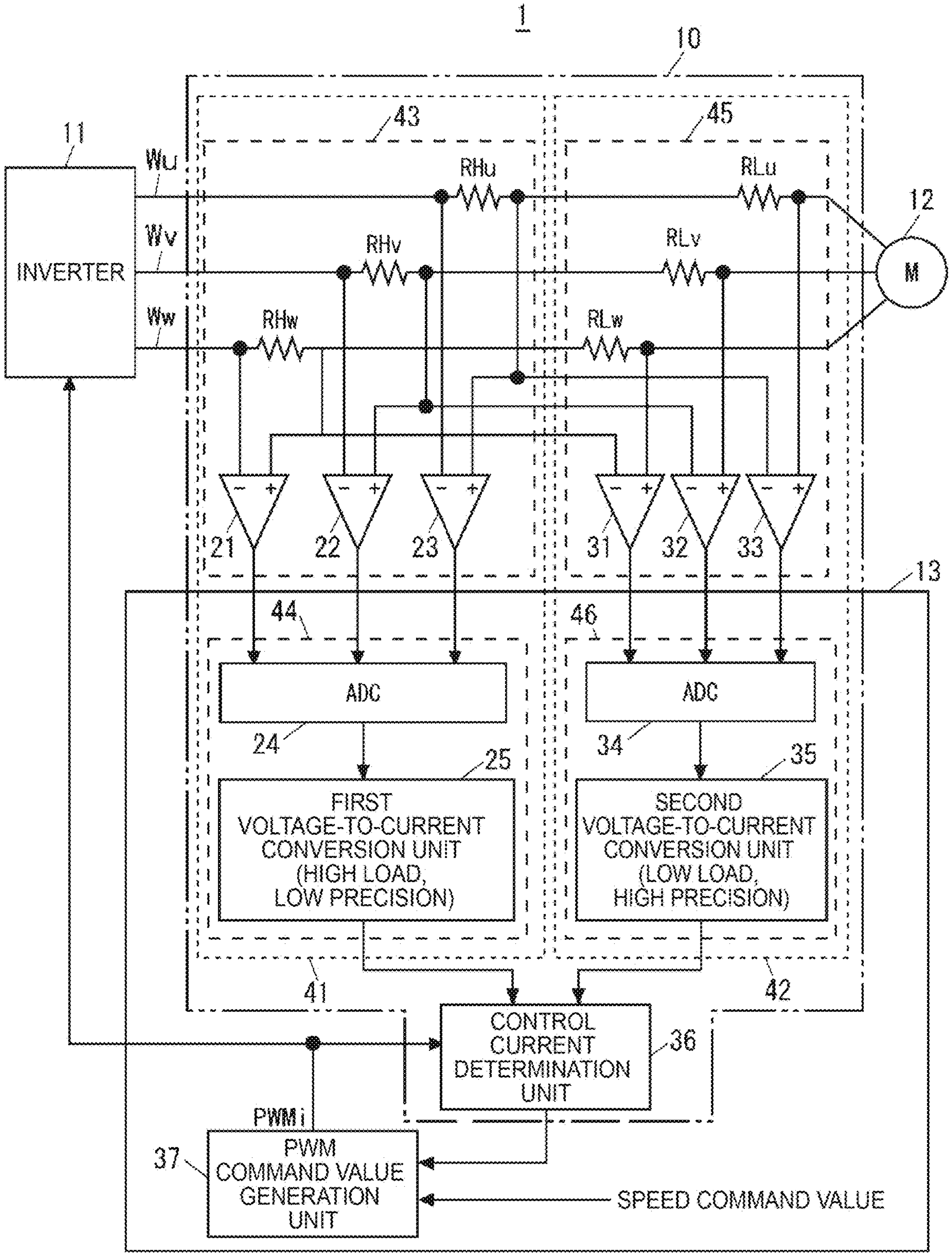
FIG. 1 is a block diagram of a motor drive device according to a first embodiment.

In order to clarify the explanation, the following description and drawings have been omitted or simplified as appropriate. Each element described in the drawing as a functional block that performs various processes can be configured with a central processing unit (CPU), a memory, and other circuits in terms of hardware, and can be realized by a program or the like loaded into a memory in terms of software. Therefore, those skilled in the art will understand that these functional blocks can be realized in various forms by hardware alone, software alone, or a combination thereof, and are not limited to either. In each drawing, the same elements are designated by the same reference signs, and duplicate explanations are omitted as necessary.

The program described above includes a set of instructions (or software code) for causing the computer to perform one or more of the functions described in the embodiments when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD) or other memory technologies, a compact disc read-only memory (CD-ROM), a digital versatile disc (DVD), a Blu-ray (registered trademark) disc or other optical disc storages, a magnetic cassette, a magnetic tape, a magnetic disc storage, or other magnetic storage devices. The program may be transmitted on a transitory computer-readable medium or a communication medium. The example of the transitory computer-readable medium or the communication medium includes, but is not limited to, an electrical, optical, acoustic, or other form of propagating signal.

First Embodiment

FIG. 1 shows a block diagram of a motor drive device 1 according to a first embodiment. A current detection device 10 according to the first embodiment is configured using some of the components that make up a motor drive device 1. Specifically, as shown in FIG. 1, the motor drive device 1 according to the first embodiment includes an inverter 11, a motor 12, and a calculation device 13. The motor drive device 1 also includes, for drive current measurement, high load current detection resistors RHu, RHv, RHw, low load current detection resistors RLu, RLv, RLw, operational amplifiers 21 to 23, and operational amplifiers 31 to 33.

In the motor drive device 1 according to the first embodiment, the calculation device 13 generates a PWM command value PWMi, and the inverter 11 outputs, while controlling a frequency and duty ratio of a PWM signal based on the PWM command value PWMi, the PWM signal as a drive signal. As shown in FIG. 1, in the motor drive device 1 according to the first embodiment, the inverter 11 gives three-phase drive signals having different phases to the motor 12 through three wirings of motor drive lines Wu, Wv, and Ww. The calculation device 13 detects the drive currents output by the inverter 11, and uses the magnitude of the drive currents as values of control currents to generate the PWM command value PWMi.

A feature of the motor drive device 1 according to the first embodiment is detection of drive currents and calculation of the value of the control current based on the detected drive currents. Therefore, the current detection device 10 that detects drive currents and calculates the value of the control current based on the detected drive currents will be described in detail below. In the following description, an example will be described in which the motor drive device 1 has a steady operation mode and an instantaneous output operation mode. The steady operation mode is a mode in which the motor 12 is controlled within a rated value range with respect to the output currents of the inverter 11. The instantaneous output operation mode is a mode in which the inverter 11 is allowed to output instantaneously (few seconds or shorter at the maximum) output current values equal to or larger than the rated value.

As shown in FIG. 1, the current detection device 10 includes a first current calculation unit 41 and a second current calculation unit 42. The first current calculation unit 41 performs a first current calculation process. In the process, the first current calculation unit 41 calculates a first current value obtained by converting a non-rated drive current that fluctuates in a range larger than a preset rated value out of drive currents output by the inverter 11 that drives the motor 12 into a digital value using a first resolution.

FIG. 1 shows an example of a configuration for performing the above operation. In the example shown in FIG. 1, the first current calculation unit 41 includes a first voltage measurement unit 43 and a high load side current calculation unit 44. The first voltage measurement unit 43 converts a voltage in a voltage range corresponding to the non-rated drive current to a voltage within a first input range, and outputs a high voltage input voltage. The high load side current calculation unit 44 converts the high voltage input voltage into a digital value, and calculates the first current value from the high voltage input voltage converted into the digital value.

More specifically, in the example shown in FIG. 1, the first voltage measurement unit 43 includes the high load current detection resistors RHw, RHv, RHu, and the operational amplifiers 21 to 23. Here, the resistance values of the high load current detection resistors RHw, RHv, RHu are fixed in a mounted state and have known resistance values. The high load current detection resistor RHu is inserted in series with the motor drive line Wu through which a U-phase drive signal among three-phase drive signals is transmitted. The high load current detection resistor RHv is inserted in series with the motor drive line Wv through which a V-phase drive signal among the three-phase drive signals is transmitted. The high load current detection resistor RHw is inserted in series with the motor drive line Ww through which a W-phase drive signal among the three-phase drive signals is transmitted. The operational amplifier 21 reduces a voltage difference between both ends of the high load current detection resistor RHw to a voltage within the first input range, and outputs the reduced voltage as a high voltage input voltage. The operational amplifier 22 reduces a voltage difference between both ends of the high load current detection resistor RHv to a voltage within the first input range, and outputs the reduced voltage as the high voltage input voltage. The operational amplifier 23 reduces a voltage difference between both ends of the high load current detection resistor RHu to a voltage within the first input range, and outputs the reduced voltage as the high voltage input voltage. That is, the first voltage measurement unit 43 outputs high voltage input voltages for three channels corresponding to three-phase drive currents. Further, the high voltage input voltages of the three channels each have a voltage value within the first input range. These high voltage input voltages of the three channels are sequentially processed channel by channel in the high load side current calculation unit 44 described later. Moreover, the high voltage input voltages each have an analog value.

In the example shown in FIG. 1, the high load side current calculation unit 44 includes a first AD conversion unit 24 and a first voltage-to-current conversion unit 25. Here, the first AD conversion unit 24 and the first voltage-to-current conversion unit 25 are available from units built into the calculation device 13.

The first AD conversion unit 24 switches the channel to be processed in synchronization with the cycle specified by the PWM command value PWMi, and converts the high voltage input voltage having an analog value given from the first voltage measurement unit 43 into a digital value for each channel. Note that the first input range, which is a dynamic range of the high voltage input voltage, is a voltage range with an input dynamic range of the first AD conversion unit 24 being a maximum value. Further, the first resolution in the first current calculation unit 41 depends on the resolution of the first AD conversion unit 24.

The first voltage-to-current conversion unit 25 outputs, as the first current value, a value obtained by dividing the digital value of the high voltage input voltage output by the first AD conversion unit 24 by the resistance value of a corresponding one of the high load current detection resistors RHu, RHv, RHw.

The second current calculation unit 42 performs a second current calculation process. In the process, the second current calculation unit 42 calculates a second current value obtained by converting a within-rating drive current that fluctuates in a current range within the preset rated value out of drive currents output by the inverter 11 that drives the motor 12 into a digital value using a second resolution.

FIG. 1 shows an example of a configuration for performing the above operation. In the example shown in FIG. 1, the second current calculation unit 42 includes a second voltage measurement unit 45 and a low load side current calculation unit 46. The second voltage measurement unit 45 converts a voltage in a voltage range corresponding to the within-rating drive current to a voltage within a second input range, and outputs a low voltage input voltage. The low load side current calculation unit 46 converts the low voltage input voltage into a digital value, and calculates the second current value from the low voltage input voltage converted into the digital value.

More specifically, in the example shown in FIG. 1, the second voltage measurement unit 45 includes the low load current detection resistors RLw, RLv, RLu, and the operational amplifiers 31 to 33. Here, the resistance values of the low load current detection resistors RLw, RLv, RLu are fixed in a mounted state and have known resistance values. The low load current detection resistor RLu is inserted in series with the motor drive line Wu through which the U-phase drive signal among the three-phase drive signals is transmitted. That is, the low load current detection resistor RLu is connected in series with the high load current detection resistor RHu on the motor drive line Wu. The low load current detection resistor RLv is inserted in series with the motor drive line Wv through which the V-phase drive signal among the three-phase drive signals is transmitted. That is, the low load current detection resistor RLv is connected in series with the high load current detection resistor RHv on the motor drive line Wv. The low load current detection resistor RLw is inserted in series with the motor drive line Ww through which the W-phase drive signal among the three-phase drive signals is transmitted. That is, the low load current detection resistor RLw is connected in series with the high load current detection resistor RHw on the motor drive line Ww. The operational amplifier 31 reduces a voltage difference between both ends of the low load current detection resistor RLw to a voltage within the second input range, and outputs the reduced voltage as a low voltage input voltage. The operational amplifier 32 reduces a voltage difference between both ends of the low load current detection resistor RLv to a voltage within the second input range, and outputs the reduced voltage as the low voltage input voltage. The operational amplifier 33 reduces a voltage difference between both ends of the low load current detection resistor RLu to a voltage within the second input range, and outputs the reduced voltage as the low voltage input voltage. That is, the second voltage measurement unit 45 outputs low voltage input voltages for three channels corresponding to the three-phase drive currents. Further, the low voltage input voltages of the three channels each have a voltage value within the second input range. These low voltage input voltages of the three channels are sequentially processed channel by channel in the low load side current calculation unit 46 described later. Moreover, the low voltage input voltages each have an analog value.

In the example shown in FIG. 1, the low load side current calculation unit 46 includes a second AD conversion unit 34 and a second voltage-to-current conversion unit 35. Here, the second AD conversion unit 34 and the second voltage-to-current conversion unit 35 are available from units built into the calculation device 13.

The second AD conversion unit 34 switches the channel to be processed in synchronization with the cycle specified by the PWM command value PWMi, and converts the low voltage input voltage having an analog value given from the second voltage measurement unit 45 into a digital value for each channel. Note that the second input range, which is a dynamic range of the low voltage input voltage, is a voltage range with an input dynamic range of the second AD conversion unit 34 being a maximum value. Further, the second resolution in the second current calculation unit 42 depends on the resolution of the second AD conversion unit 34.

The second voltage-to-current conversion unit 35 outputs, as the second current value, a value obtained by dividing the digital value of the low voltage input voltage output by the second AD conversion unit 34 by the resistance value of a corresponding one of the low load current detection resistors RLu, RLv, RLw.

In the above description, the rated value is, for example, a current value of about 10 A, and the maximum value of the non-rated drive current is considered to be a current value of about 100 A. In addition, in the current detection device 10, when an analog-to-digital conversion circuit built in the calculation device 13 is used, the first input range that is the dynamic range of the high voltage input voltage obtained using the high load current detection resistors, and the second input range that is the dynamic range of the low voltage input voltage obtained using the low load current detection resistors are preferably the same input range. Further, in the current detection device 10, when the analog-to-digital conversion circuit built in the calculation device 13 is used, the first resolution that is the resolution of the first AD conversion unit 24, and the second resolution that is the resolution of the second AD conversion unit 34 are preferably the same resolution.

In this way, by setting the first input range and the second input range to the same range, and setting the first resolution and the second resolution to the same resolution, the ranges different in size can be expressed using the same resolution. For example, the first current value is expressed by steps obtained by dividing 100 A by the first resolution (for example, 12 bits: 4096), and the second current value is expressed by steps obtained by dividing 10 A by the second resolution (for example, 12 bits: 4096). That is, in the current detection device 10 according to the first embodiment, the second current value provides a measurement result with high precision, and the first current value corresponds to a wide dynamic range. In the current detection device 10 according to the first embodiment, for example, a range defined by the absolute value of the rated value is set as a first threshold range. When the first current value is within the first threshold range, the second current value is adopted as the control current, and when the first current value is outside the first threshold range, the first current value is adopted as the control current. As a result, in the current detection device 10 according to the first embodiment, a wide dynamic range corresponding to a large drive current and detection of a small drive current with high precision are possible. Note that even when the detection precision is low for a large drive current, the proportion of error included in the value of the control current is relatively small. This poses no problem in terms of control.

In the first embodiment, a control current determination unit 36 determines whether the first current value is within the first threshold range. The magnitude of the first current value may be determined based on the numerical value of the first current value. The magnitude of the first current value may be determined based on the current value indicated by the PWM command value PWMi output by a PWM command value generation unit 37.

Figure 2:
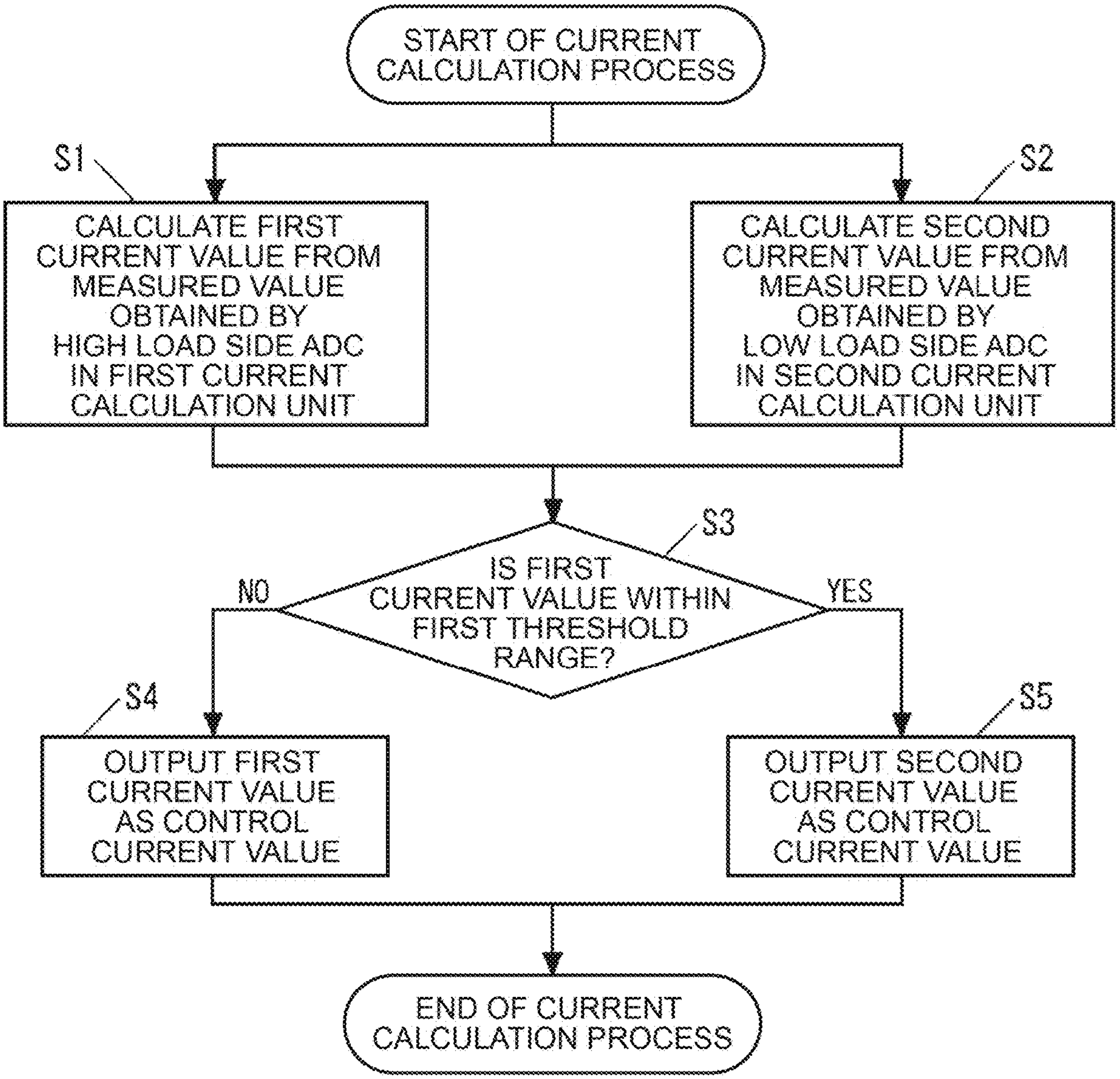
FIG. 2 is a flowchart illustrating an operation of a current detection device according to the first embodiment.

Next, an operation of the current detection device 10 according to the first embodiment will be described. FIG. 2 is a flowchart illustrating the operation of the current detection device 10 according to the first embodiment. The current detection device 10 repeatedly performs the process shown in FIG. 2 at every cycle specified by the PWM command value PWMi. As shown in FIG. 2, when the current detection device 10 starts a current calculation process, the first current calculation unit 41 and the second current calculation unit 42 calculate current values in parallel. Specifically, the first current calculation unit 41 calculates the first current value from a measured value (for example, high voltage input voltage) obtained by a high load side AD converter (ADC) (for example, the first AD conversion unit 24) (Step S1). In step S1, the first voltage-to-current conversion unit 25 calculates the first current value as a digital value using a digital value corresponding to the high voltage input voltage. The second current calculation unit 42 calculates the second current value from a measured value (for example, low voltage input voltage) obtained by a low load side ADC (for example, the second AD conversion unit 34) (Step S2). In step S2, the second voltage-to-current conversion unit 35 calculates the second current value as a digital value using a digital value corresponding to the low voltage input voltage.

After that, in the current detection device 10, the control current determination unit 36 determines whether the first current value calculated in step S1 is within the first threshold range (for example, a range defined by the absolute value of the rated value) (step S3). In step S3, when the first current value is outside the first threshold range, the control current determination unit 36 outputs the first current value as the value of the control current to the PWM command value generation unit 37 (step S4), and the current calculation process ends. In step S3, when the first current value is within the first threshold range, the control current determination unit 36 outputs the second current value as the value of the control current to the PWM command value generation unit 37 (step S5), and the current calculation process ends.

Figure 3:
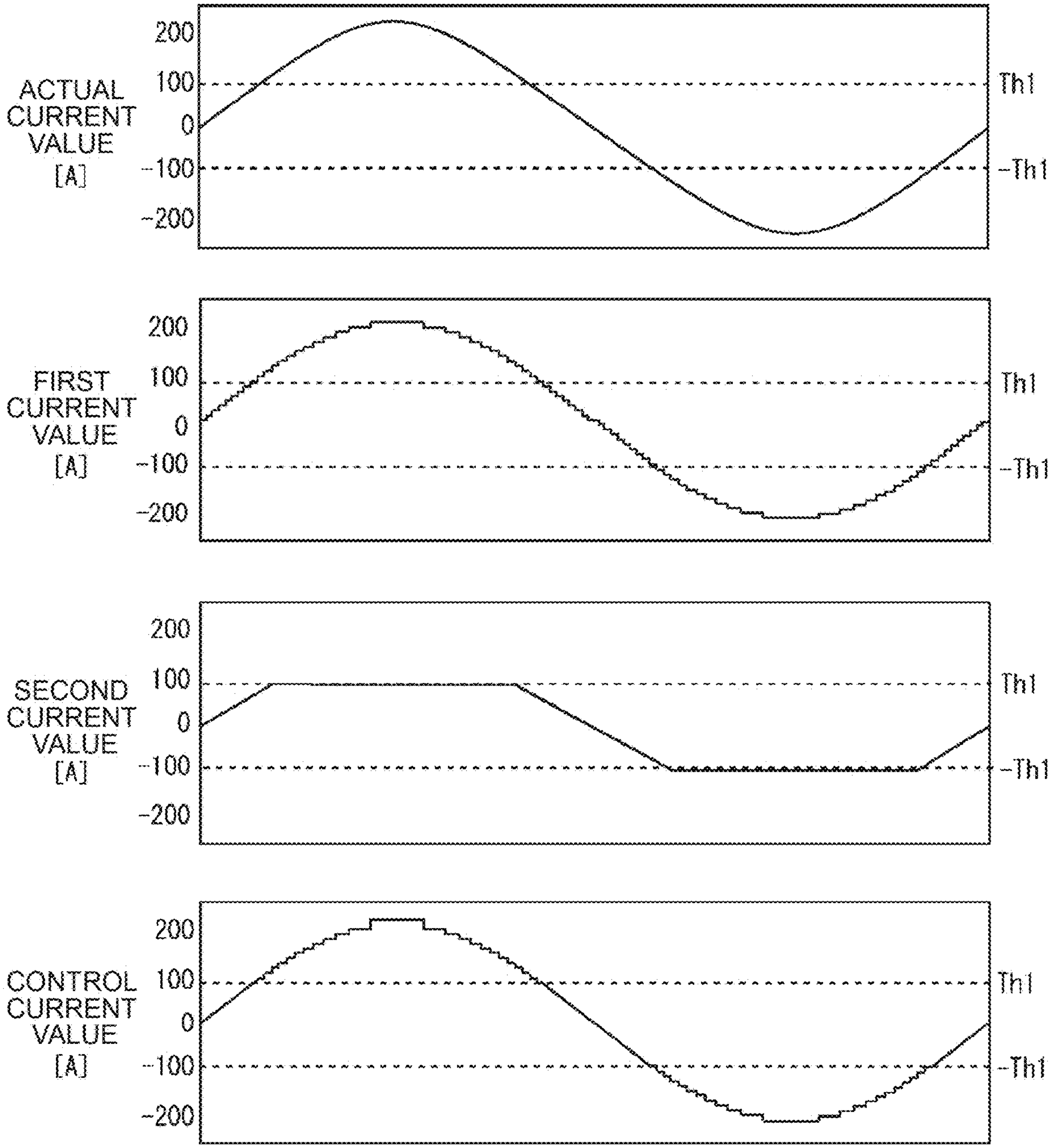
FIG. 3 is a timing chart illustrating an operation of the current detection device according to the first embodiment.

Here, FIG. 3 shows a timing chart illustrating the operation of the current detection device 10 according to the first embodiment, and the value of the control current generated by the operation described in FIG. 2 will be described. First, as shown in FIG. 3, the first threshold range is set between an upper threshold Th1 corresponding to a positive value of the rated value and a lower threshold—Th1 corresponding to a negative value of the rated value. As shown in FIG. 3, in the current detection device 10 according to the first embodiment, the first current value is calculated as a value that follows the magnitude of the actual drive current. On the other hand, the second current value is calculated as a value with the first threshold range as the upper limit. In the current detection device 10 according to the first embodiment, the value of the control current is calculated by applying the first current value with low resolution in a range exceeding the first threshold range, and the value of the control current is calculated by applying the second current value with high resolution in a range within the first threshold range.

From the above description, the current detection device 10 according to the first embodiment obtains each of the first current value corresponding to a drive current that changes over a wide dynamic range exceeding the rated value and the second current value corresponding to a drive current that changes within the rated value, and then switches the current to be adopted as the value of the control current between the first current value and the second current value based on whether the first current value is outside the first threshold range. Accordingly, with the current detection device 10 according to the first embodiment, it is possible to achieve both a wide dynamic range and current detection with high precision.

Moreover, in the current detection device 10 according to the first embodiment, the first voltage measurement unit 43 and the second voltage measurement unit 45 are used to compress the voltage detected using each current resistor to the voltage within the input dynamic range of the calculation device 13. Accordingly, in the current detection device 10 according to the first embodiment, a product that supports a high withstand voltage is not used, but a product with a general withstand voltage can be used as the calculation device 13, so that the range of product usage can be expanded.

Second Embodiment

In a second embodiment, a motor drive device 2 including a current detection device 10*a* that is another form of the current detection device 10 of the first embodiment will be described. Note that in the description of the second embodiment, the same components as those described in the first embodiment are given the same reference signs as those in the first embodiment, and the description of the components will be omitted.

Figure 4:
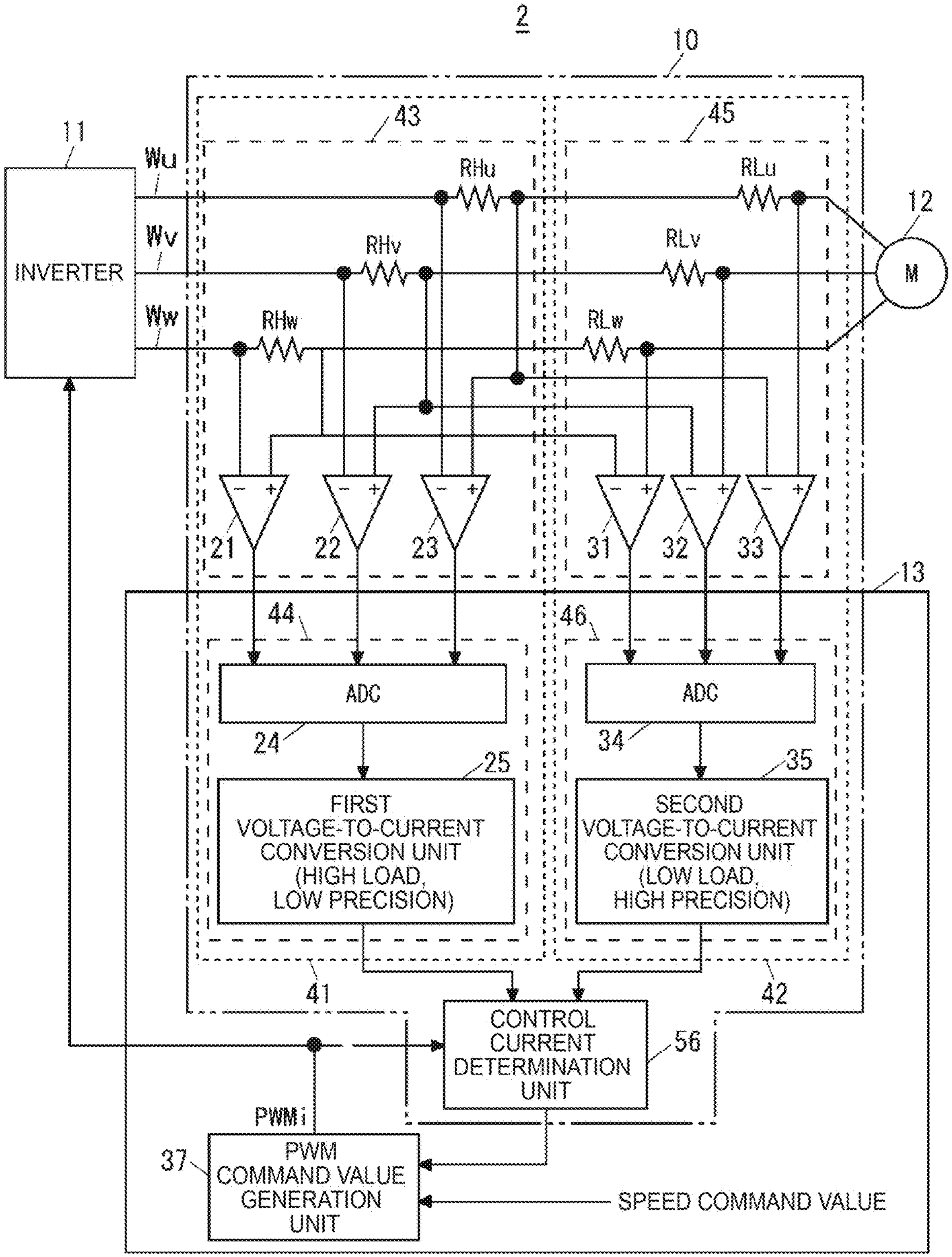
FIG. 4 is a block diagram of a motor drive device according to a second embodiment.

FIG. 4 shows a block diagram of the motor drive device according to the second embodiment. As shown in FIG. 4, the motor drive device 2 according to the second embodiment includes a current detection device 10*a* in which the control current determination unit 36 of the current detection device 10 is replaced with a control current determination unit 56. The low load side current calculation unit 46 uses the upper threshold Th1 of the first threshold range and a second threshold Th2 to switch between the current values to be adopted as the value of the control current. The second threshold Th2 is a value smaller than the upper threshold Th1 of the first threshold range. An operation of the control current determination unit 56 will be described below. Note that the range defined by the absolute value of the second threshold Th2 is referred to as a second threshold range. That is, the second threshold range is included in the first threshold range and is narrower and lower than the first threshold range.

In the second embodiment, the operation will be described only on the positive side of the threshold range, but it goes without saying that it is understood that the operation on the negative side is similar to that on the positive side. In the second embodiment, the upper threshold Th1 of the first threshold range will be simply referred to as the first threshold Th1.

Figure 5:
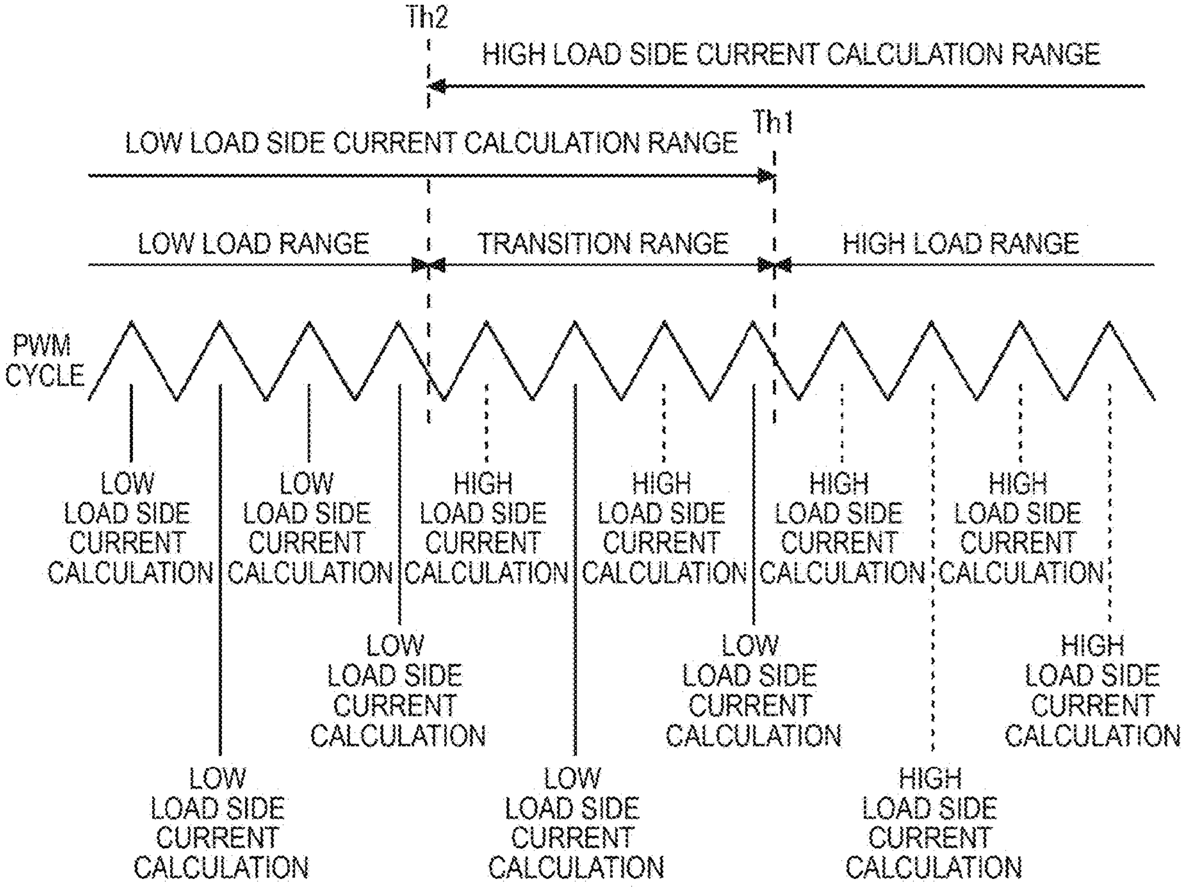
FIG. 5 is a diagram illustrating load determination ranges and current calculation timings for the load determination ranges in a control current determination unit according to the second embodiment.

FIG. 5 is a diagram illustrating load determination ranges and current calculation timings for the load determination ranges in the control current determination unit 56 according to the second embodiment. As shown in FIG. 5, the current detection device 10*a* performs current calculation processes in synchronization with the cycle specified by the PWM command value PWMi. In a low load range where the second current value is smaller than the second threshold Th2, the control current determination unit 56 performs only a low load side current calculation process in which the second current value that is a value with high precision for low load operation is adopted as the value of the control current. On the other hand, in a high load range where the second current value is larger than the first threshold Th1, the control current determination unit 56 performs only a high load side current calculation process in which the first current value detected in a wide dynamic range for high load operation is adopted as the value of the control current.

In a transition range where the second current value is equal to or more than the second threshold Th2 and the second current value is equal to or less than the first threshold Th1, the control current determination unit 56 alternately performs the high load side current calculation process and the low load side current calculation process so that, as the value of the control current, the first current value and the second current value are alternately adopted.

That is, in the current detection device 10*a* according to the second embodiment, when the control current determination unit 56 determines that the second current value is larger than the first threshold Th1, only the high load side current calculation process is performed in which the first current value is output as the value of the control current. Further, when the control current determination unit 56 determines that the second current value is equal to or larger than the second threshold Th2 and the second current value is equal to or less than the first threshold Th1, the first current value and the second current value are alternately output as the value of the control current at each output timing. Further, when the control current determination unit 56 determines that the second current value is smaller than the second threshold Th2, only the low load side current calculation process is performed in which the second current value is output as the value of the control current.

Figure 6:
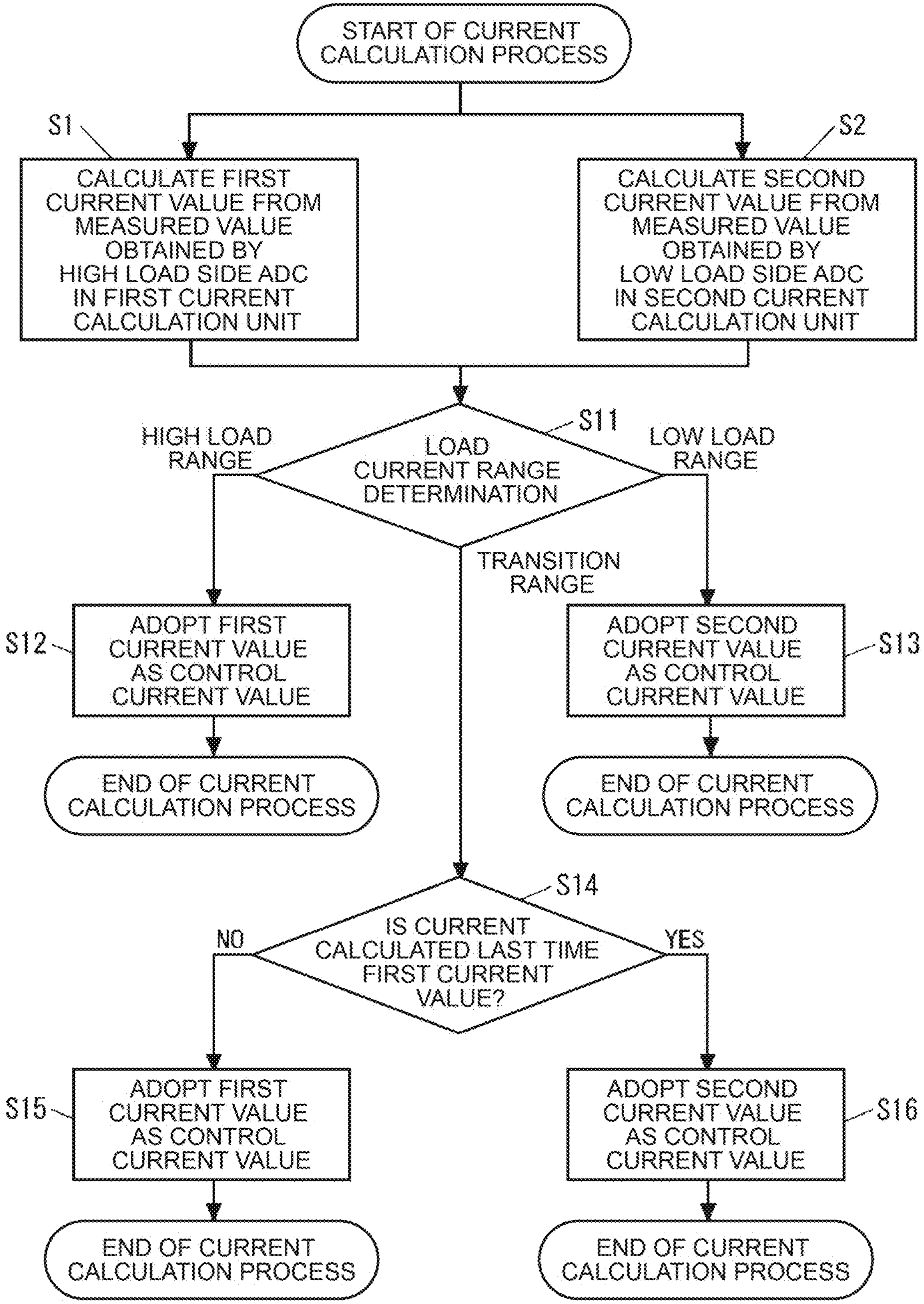
FIG. 6 is a flowchart illustrating an operation of a current detection device according to the second embodiment.

Next, an operation of the current detection device 10*a* according to the second embodiment will be described. FIG. 6 is a flowchart illustrating the operation of the current detection device 10*a* according to the second embodiment. The current detection device 10*a* repeatedly performs the process shown in FIG. 6 at every cycle specified by the PWM command value PWMi. As shown in FIG. 6, when the current detection device 10*a* starts a current calculation process, the first current calculation unit 41 and the second current calculation unit 42 calculate current values in parallel. Specifically, the first current calculation unit 41 calculates the first current value from a measured value (for example, high voltage input voltage) obtained by a high load side ADC (for example, the first AD conversion unit 24) (Step S1). In step S1, the first voltage-to-current conversion unit 25 calculates the first current value as a digital value using a digital value corresponding to the high voltage input voltage. The second current calculation unit 42 calculates the second current value from a measured value (for example, low voltage input voltage) obtained by a low load side ADC (for example, the second AD conversion unit 34) (Step S2). In step S2, the second voltage-to-current conversion unit 35 calculates the second current value as a digital value using a digital value corresponding to the low voltage input voltage.

After that, in the current detection device 10*a*, the control current determination unit 56 compares the second current value calculated in step S2 with the first threshold Th1 and the second threshold Th2 to determine the load range (Step S11).

In step S11, when the second current value is larger than the first threshold Th1, the control current determination unit 56 outputs the first current value as the value of the control current to the PWM command value generation unit 37 (step S12), and the current calculation process ends. In step S11, when the second current value is less than the second threshold Th2, the control current determination unit 56 outputs the second current value as the value of the control current to the PWM command value generation unit 37 (step S13), and the current calculation process ends.

Further, in the determination in step S11, when it is determined that the second current value is in the transition range in which the second current value is equal to or more than the second threshold Th2 and the second current value is equal to or less than the first threshold Th1, the control current determination unit 56 adopts, as the value of the control current, the other current that is different from the current adopted as the value of the control current in the last process cycle, so that the first control current and the second control current are alternately adopted as the value of the control current (steps S14, S15, S16).

From the above description, in the current detection device 10*a* according to the second embodiment, the transition range in which the first current value and the second current value are alternately adopted as the value of the control current is provided between the low load range in which the second current value is adopted as the value of the control current and the high load range in which the first current value is adopted as the value of the control current. With this transition range, the current detection device 10*a* according to the second embodiment can suppress frequent repetition of a state in which the precision of the value of the control current changes rapidly, thereby increasing the stability of control.

Note that in motor control, low-pass filtering is applied to the value of the control current. Because of this low-pass filtering, when the values of the control currents with different precisions are alternately input with regularity, such as in the transition range, the control will not become unstable.

Although the present disclosure has been specifically described based on the embodiments, the present disclosure is not limited to the embodiments already described, and various changes can be made to the present disclosure without departing from the gist thereof.

What is claimed is:

1. A current detection device, comprising:

a first current calculation unit configured to calculate a first current value that is a current value obtained by converting a non-rated drive current into a digital value using a first resolution, the non-rated drive current being a current that fluctuates in a larger range than a preset rated value out of drive currents output by an inverter configured to drive a motor;

a second current calculation unit configured to calculate a second current value that is a current value obtained by converting a within-rating drive current into a digital value using a second resolution, the within-rating drive current being a current that fluctuates in a current range within the rated value out of the drive currents; and a control current determination unit that is configured to output the second current value as a value of a control current during a period in which the first current value is within a preset first threshold range, and output the first current value as the value of the control current during a period in which the first current value is outside the first threshold range.

2. The current detection device according to claim 1, wherein the control current determination unit is configured to, when determination is made that the second current value is within the first threshold range and the second current value is outside a second threshold range narrower than the first threshold range, alternately output the first current value and the second current value as the value of the control current at each output timing.

3. The current detection device according to claim 2, wherein the control current determination unit is configured to:

when determination is made that the second current value is outside the first threshold range, output the first current value as the value of the control current;

when determination is made that the second current value is outside the second threshold range and the second current value is within the first threshold range, alternately output the first current value and the second current value as the value of the control current at each output timing; and when determination is made that the second current value is within the second threshold range, output the second current value as the value of the control current.

4. The current detection device according to claim 1, wherein the first threshold range is a range equal to or less than the rated value.

5. The current detection device according to claim 1, wherein the first resolution and the second resolution are the same resolution.

6. The current detection device according to claim 1, wherein:

the first current calculation unit includes a first voltage measurement unit configured to convert a voltage in a voltage range corresponding to the non-rated drive current into a voltage in a first input range, and output a high voltage input voltage, and a high load side current calculation unit configured to convert the high voltage input voltage into a digital value, and calculate the first current value from the high voltage input voltage converted to the digital value; and the second current calculation unit includes a second voltage measurement unit configured to convert a voltage in a voltage range corresponding to the within-rating drive current into a voltage in a second input range, and output a low voltage input voltage, and a low load side current calculation unit configured to convert the low voltage input voltage into a digital value, and calculate the second current value from the low voltage input voltage converted to the digital value.

7. The current detection device according to claim 6, wherein the first input range and the second input range are voltage ranges of the same size.

8. The current detection device according to claim 1, wherein the control current determination unit is configured to output the value of the control current to a pulse width modulation command value generation unit, the pulse width modulation command value generation unit being configured to generate a pulse width modulation command value, and the pulse width modulation command value being a command value for specifying at least one of a duty ratio and a frequency of a pulse width modulation signal output by the inverter using the value of the control current as one parameter.

9. A current detection method performed by a calculation device that is configured to measure a drive current output by an inverter configured to drive a motor, and calculate a control current corresponding to a magnitude of the drive current, the current detection method comprising:

calculating a first current value that is a current value obtained by converting a non-rated drive current into a digital value using a first resolution, the non-rated drive current being a current that fluctuates in a larger range than a preset rated value out of the drive currents;

calculating a second current value that is a current value obtained by converting a within-rating drive current into a digital value using a second resolution, the within-rating drive current being a current that fluctuates within the preset rated value out of the drive currents;

outputting the second current value as a value of the control current during a period in which the first current value is within a preset first threshold range; and outputting the first current value as the value of the control current during a period in which the first current value is outside the first threshold range.

10. A non-transitory storage medium storing instructions that are executable by one or more processors and cause the one or more processors to perform functions comprising:

measuring a drive current output by an inverter that drives a motor, and calculating a control current corresponding to a magnitude of the drive current;

calculating a first current value that is a current value obtained by converting a non-rated drive current into a digital value using a first resolution, the non-rated drive current being a current that fluctuates in a larger range than a preset rated value out of the drive currents;

calculating a second current value that is a current value obtained by converting a within-rating drive current into a digital value using a second resolution, the within-rating drive current being a current that fluctuates within the preset rated value out of the drive currents;

outputting the second current value as a value of the control current during a period in which the first current value is within a preset first threshold range; and outputting the first current value as the value of the control current during a period in which the first current value is outside the first threshold range.

* * * * *